United States Patent
Auner et al.

(10) Patent No.: US 11,104,582 B2
(45) Date of Patent: Aug. 31, 2021

(54) PROCESS FOR THE CLEAVAGE OF SILICON-SILICON BONDS AND/OR SILICON-CHLORINE BONDS IN MONO-, POLY- AND/OR OLIGOSILANES

(71) Applicant: Momentive Performance Materials GmbH, Leverkusen (DE)

(72) Inventors: Norbert Auner, Glashütten (DE); Max C. Holthausen, Oberursel (DE); Felix Neumeyer, Dreieich (DE)

(73) Assignee: Momentive Performance Materials GmbH, Leverkusen (DE)

( * ) Notice: Subject to any disclaimer, the term of this patent is extended or adjusted under 35 U.S.C. 154(b) by 0 days.

(21) Appl. No.: 15/327,145

(22) PCT Filed: Jul. 20, 2015

(86) PCT No.: PCT/DE2015/000359
§ 371 (c)(1),
(2) Date: Jan. 18, 2017

(87) PCT Pub. No.: WO2016/011993
PCT Pub. Date: Jan. 28, 2016

(65) Prior Publication Data
US 2017/0166452 A1 Jun. 15, 2017

(30) Foreign Application Priority Data
Jul. 22, 2014 (DE) .......................... 102014010674.8

(51) Int. Cl.
C01B 33/107 (2006.01)
C08G 77/60 (2006.01)
C07F 7/12 (2006.01)

(52) U.S. Cl.
CPC ...... *C01B 33/10773* (2013.01); *C01B 33/107* (2013.01); *C01B 33/10742* (2013.01);
(Continued)

(58) Field of Classification Search
CPC ............ C01B 33/107; C01B 33/10742; C01B 33/10757; C01B 33/10773; C07F 7/125
See application file for complete search history.

(56) References Cited

U.S. PATENT DOCUMENTS 3,012,006 A    12/1961 Holbrook et al.
3,878,234 A *  4/1975 Atwell ................... C07F 7/122
                                                        556/468

(Continued)

OTHER PUBLICATIONS

International Search Report for corresponding PCT/DE2015/000359 dated Dec. 16, 2015, one page.

(Continued)

*Primary Examiner* — Ngoc-Yen Nguyen
(74) *Attorney, Agent, or Firm* — Christopher Jan Korff; Rankin Hill & Clark LLP

(57) ABSTRACT

The invention relates to a method for cleaving silicon-silicon bindings and/or silicon-chlorine bindings in monosilanes, polysilanes, and/or oligosilanes. According to the invention, the monosilane, polysilane, and/or oligosilane is dissolved or suspended in an ether or in an ether-hydrochloric acid solution. Said method is used for example for preparing halogenated oligosilanes from halogenated polysilanes and for preparing siloxanes from organochlorosilanes and chlorinated monosilanes. Said method is particularly simple to carry out and as a result is economical.

17 Claims, 7 Drawing Sheets

(52) U.S. Cl.
CPC ........ *C01B 33/10757* (2013.01); *C07F 7/125* (2013.01); *C08G 77/60* (2013.01)

(56) References Cited

U.S. PATENT DOCUMENTS

| | | | |
|---|---|---|---|
| 4,855,473 A | 8/1989 | Würminghausen et al. | |
| 4,882,450 A | 11/1989 | Bortolin | |
| 5,025,075 A | 6/1991 | Burns | |
| 5,288,892 A | 2/1994 | Pachaly et al. | |
| 5,292,912 A | 3/1994 | Chadwick et al. | |
| 5,473,037 A * | 12/1995 | Itoh | C07F 7/0874 528/10 |
| 5,922,893 A * | 7/1999 | Tsukuno | C07F 7/128 556/467 |
| 6,337,415 B1 * | 1/2002 | Kiyomori | C07F 7/0821 556/430 |
| 6,344,578 B1 | 2/2002 | Mautner et al. | |
| 6,939,984 B2 | 9/2005 | Straussberger | |
| 8,512,666 B2 | 8/2013 | Stepp | |
| 8,680,312 B2 | 3/2014 | Tamme et al. | |
| 9,011,812 B2 | 4/2015 | Brausch et al. | |
| 9,617,391 B2 | 4/2017 | Auner et al. | |
| 9,701,795 B2 | 7/2017 | Auner et al. | |
| 9,758,383 B2 | 9/2017 | Lang et al. | |
| 2009/0169457 A1 | 7/2009 | Auner et al. | |
| 2011/0150740 A1 | 6/2011 | Auner et al. | |
| 2011/0171098 A1 * | 7/2011 | Knies | C01B 33/04 423/342 |
| 2011/0284796 A1 | 11/2011 | Auner et al. | |
| 2012/0071678 A1 | 3/2012 | Arkles et al. | |
| 2012/0321540 A1 * | 12/2012 | Auner | C01B 33/04 423/347 |
| 2013/0259790 A1 | 10/2013 | Wieber et al. | |

OTHER PUBLICATIONS

Sauer et al., "Derivatives of the Methylchlorosilanes. V. Polysiloxanes from Methyldichlorosilane," J. Am. Chem. Soc., 1946, vol. 68, pp. 962-963.
Chainani et al., "Cleavage of Silicon-Silicon Bonds on an Alumina Column," The Journal of Organic Chemistry, 1963, vol. 28, pp. 2146-2148.
Definition of "Ether" aus Duden (German Dictionary)—Das Woerterbuch chemischer Fachausdrücke, Mannheim, 2003.
www.chemgapedia.de; Ether: Struktur and Nomenklatur; printed Sep. 1, 2017, two pages.
Translation of Römpp's Chemistry Lexicon, Expanded Edition 1993, p. 3978, "Salzäure" ("Salt Acid"), one page.
Römpp's Chemistry Lexicon, Expanded Edition 1993, p. 3978, "Salzäure".

* cited by examiner

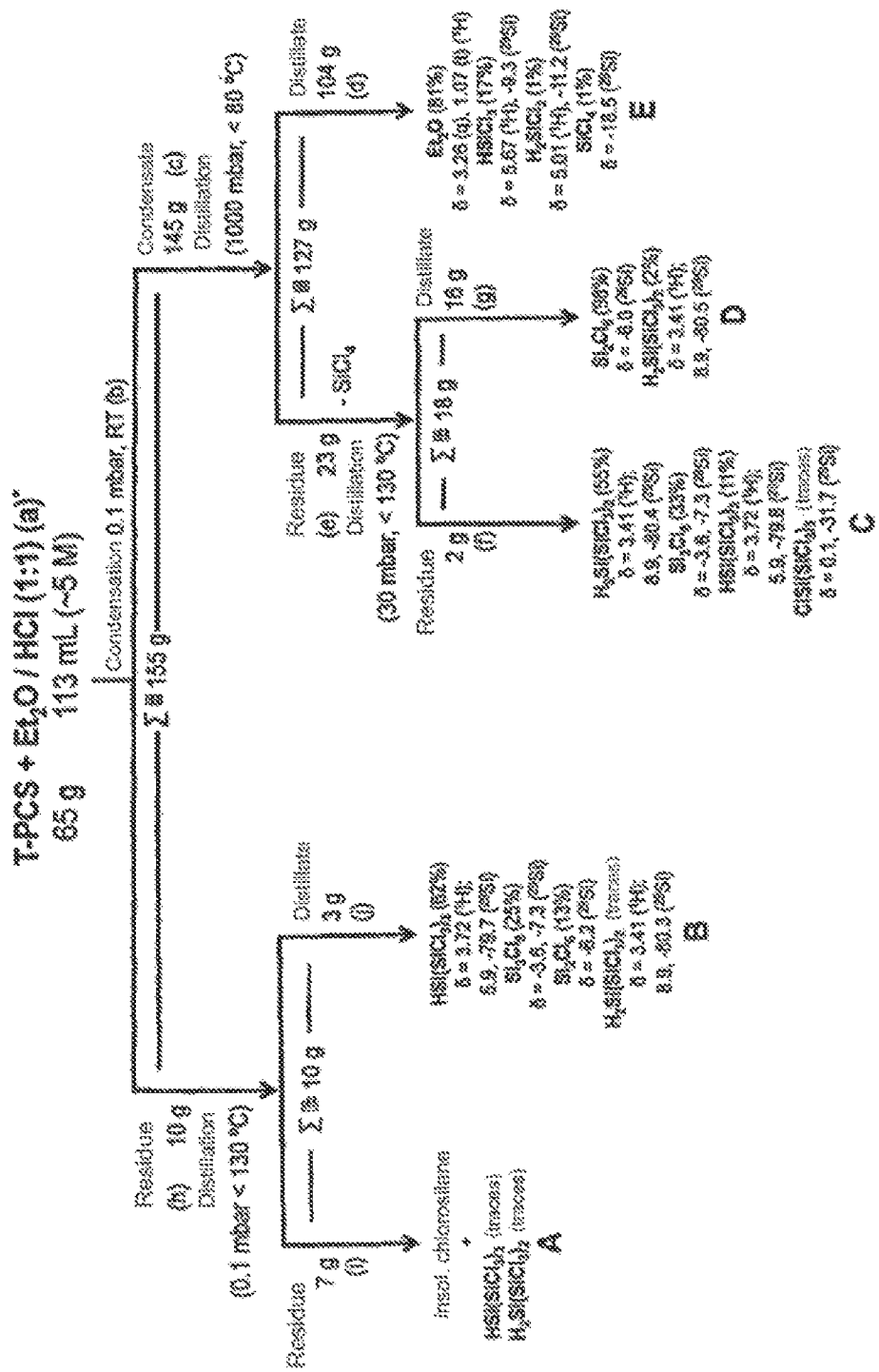
FIGURE 1: Flow chart of the reaction products of the reaction of T-PCS with HCl/Et₂O of the stoichiometry 1:1

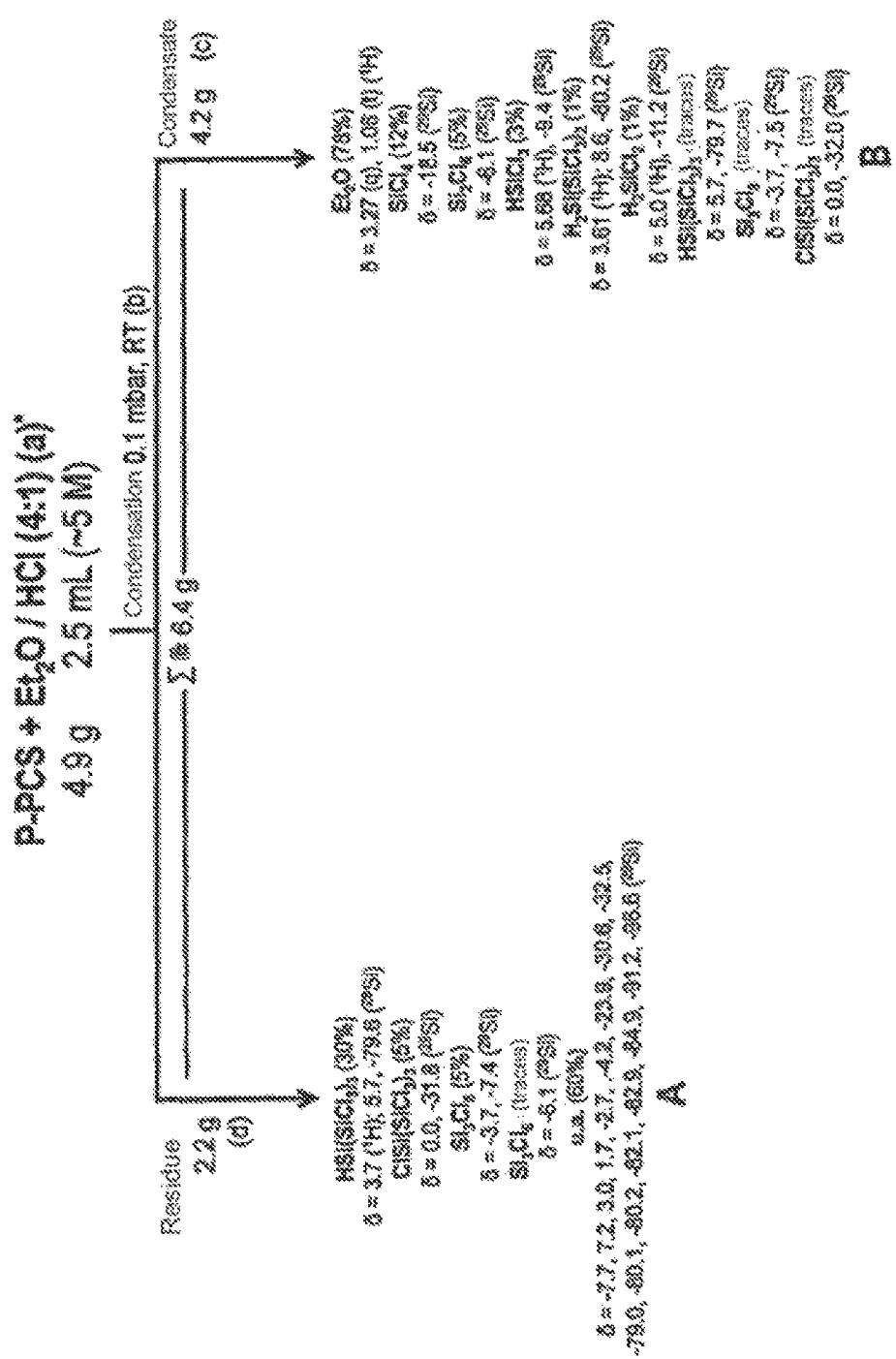
FIGURE 2: Flow chart of the reaction products of the reaction of P-PCS with HCl/Et₂O of the stoichiometry 4:1.

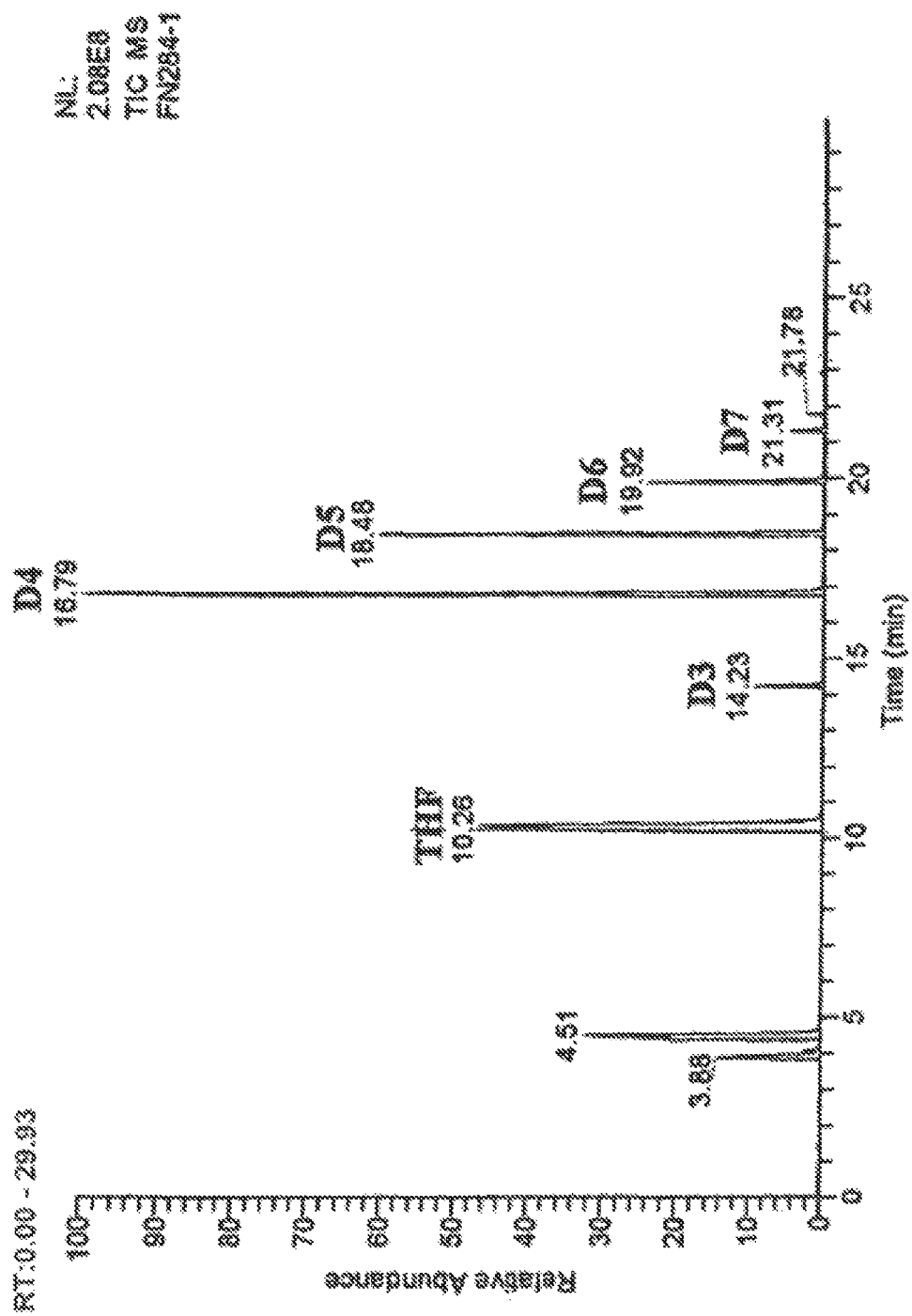
FIGURE 3: GC of the reaction solution.

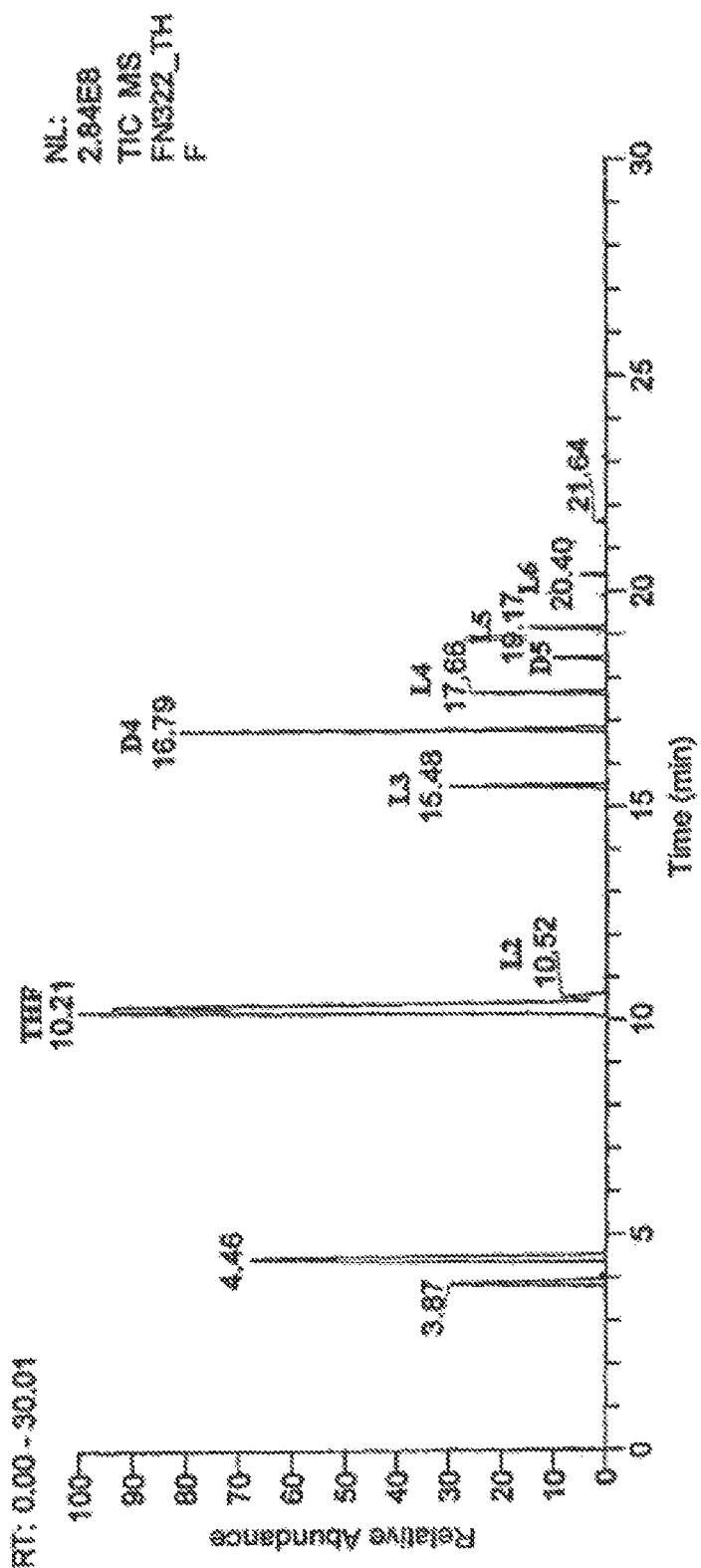
FIGURE 4: GC of the reaction solution.

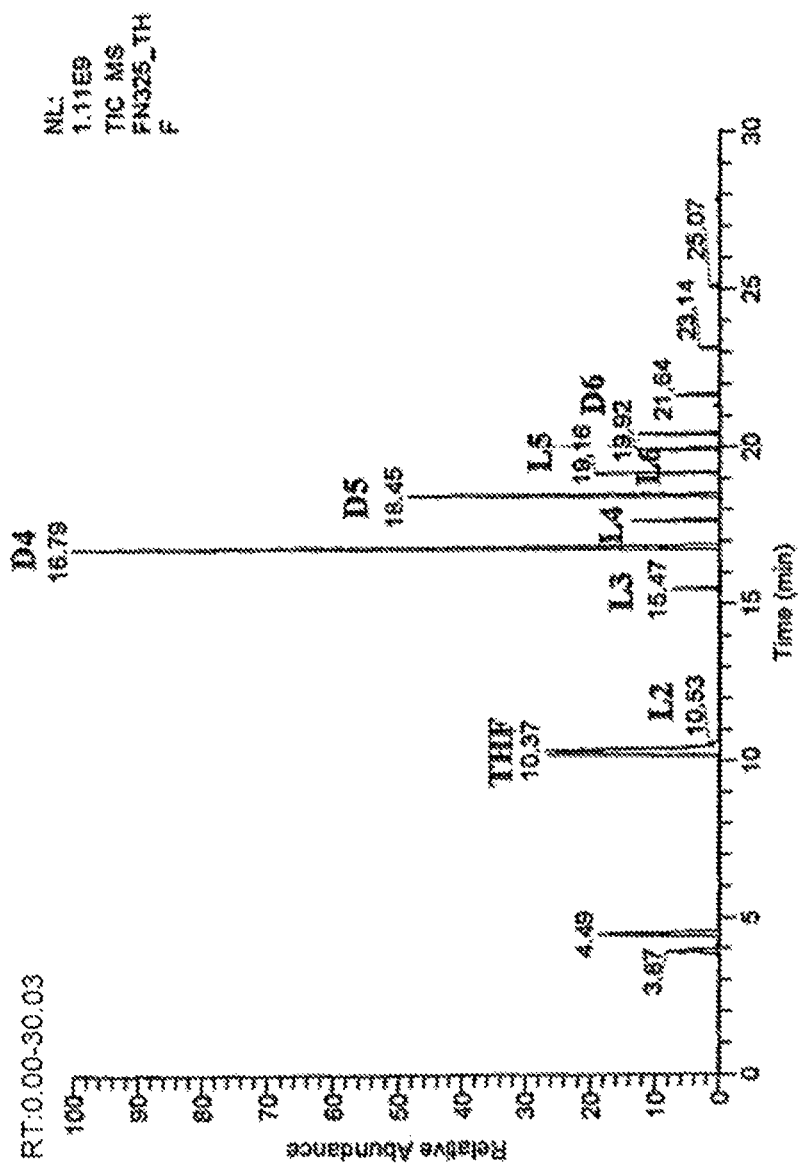
FIGURE 5: GC of the reaction solution $Me_2SiCl_2 : Me_3SiCl$ in the molar ratio 4 : 1 (above) and 1 : 4 (subsequent page)

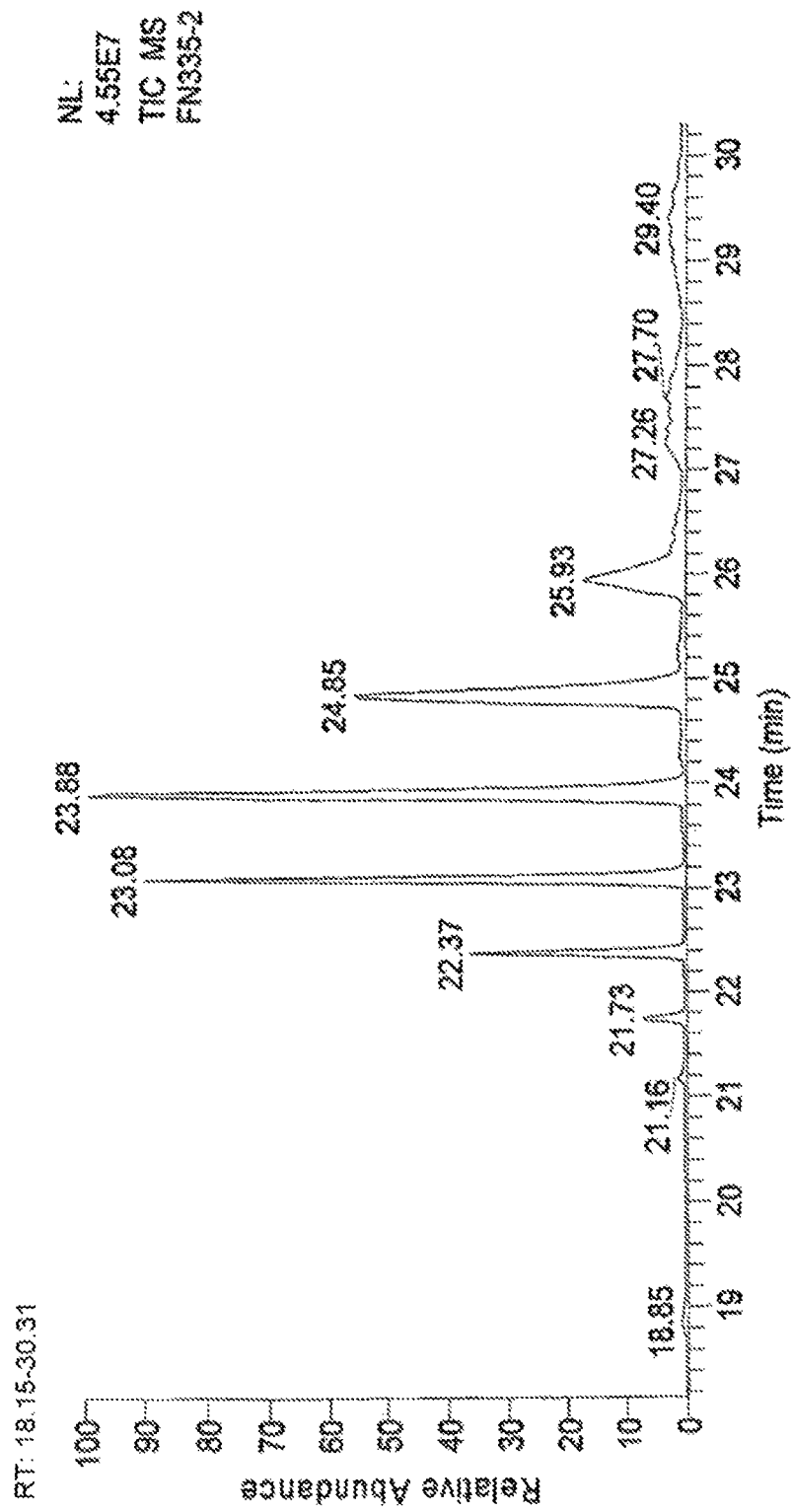
FIGURE 6: GC of the reaction solution.

PROCESS FOR THE CLEAVAGE OF SILICON-SILICON BONDS AND/OR SILICON-CHLORINE BONDS IN MONO-, POLY- AND/OR OLIGOSILANES

The present invention relates to a process for the cleavage of silicon-silicon bonds and/or silicon-chlorine bonds in mono-, poly- and/or oligosilanes.

Polysilanes per se are chain-like structured silicon hydrogen compounds of the general formula $Si_nH_{2n+2}$. The method described herein also covers substituted polysilanes in which hydrogen atoms are replaced by appropriate substituents, especially halogens.

Oligosilanes are corresponding oligomers of the polysilanes obtained in particular by degradation of polymers, but also arise as the most undesirable by-products in the production of mono-(Müller-Rochow/direct process) and oligosilanes.

It is known to synthesize halogenated polysilanes of the general composition $(X_2Si)_n$ or $X_3Si\text{—}(X_2Si)_n\text{—}SiX_3$ (X=halogen) in two ways. A thermal process for the preparation of halogenated polysilanes is disclosed in EP 2296804 B1. Such thermally produced halogenated polysilanes have a branched structure with a high content of branched short chain and cyclic compounds, whose branching points have a share of the total mixture of more than 1 percent.

As a second way a plasma-chemical method for producing halogenated polysilanes is known, as described for example in DE 10 2008 025 261 B4. Such plasma chemically produced halogenated polysilanes have a predominantly linear structure. Both variants have different average molecular weights.

From such halogenated polysilanes halogenated oligosilanes can be derived which are important as starting materials for amorphous or crystalline silicon. Such oligosilanes are particularly interesting for the production of Si layers and Si film depositions.

There are a number of patents that deal with the subject matter discussed herein (and particularly with the disilane residue of the direct process). For example a process for the preparation of methylchlorosilanes from the high boiling residue obtained in a direct process is described in EP 0574912 B1. EP 1533315 A1 discloses a method for producing alkylchlorosilanes from residues of a direct synthesis. WO 2011/107360 A1 describes the preparation of disilanes which are amine catalyzed and cleavable with HCl.

A variety of other patents relates to the conversion of the corresponding high boilers into monomeric alkylchlorosilanes. However, all methods described are very complex and associated with high equipment difficulties. For example, the cleavage of high boilers with HCl and an aluminum chloride-containing catalyst at T>250° C. into monosilanes is described in EP 635510 A1.

EP 1179534 A1 discloses a process for working up residues of direct synthesis of organochlorosilanes. From EP 0250823 B1 a process for the preparation of organooxy-halogensilanes in the presence of catalysts is known. DE 3924193 C2 describes a method for producing an alkoxyfunctional methylpolysilane. DE 3741946 A1 discloses the preparation of polysilanes with at least 8 Si atoms.

BRIEF DESCRIPTION OF THE DRAWINGS

FIG. 1 shows a flow chart of the reaction products of the reaction of T-PCS with $HCl/Et_2O$ of the stoichiometry 1:1 as obtained in the exemplary embodiment 1.

FIG. 2 shows a flow chart of the reaction products of the reaction of P-PCS with $HCl/Et_2O$ of the stoichiometry 4:1 as obtained in the exemplary embodiment 2.

FIG. 3 shows a GC of the reaction a reaction of $Me_2SiCl_2$ with $HCl/Et_2O$ at 120° C. for 67 h.

FIG. 4 shows a GC of the reaction of mixtures of $Me_2SiCl_2$ and $Me_3SiCl$ with $HCl/Et_2O$ (68 h at 120° C.).

FIG. 6 shows a GC of the reaction of mixtures of $MeSiCl_3$, $EtSiCl_3$ and $ViSiCl_3$.

Figure 5:
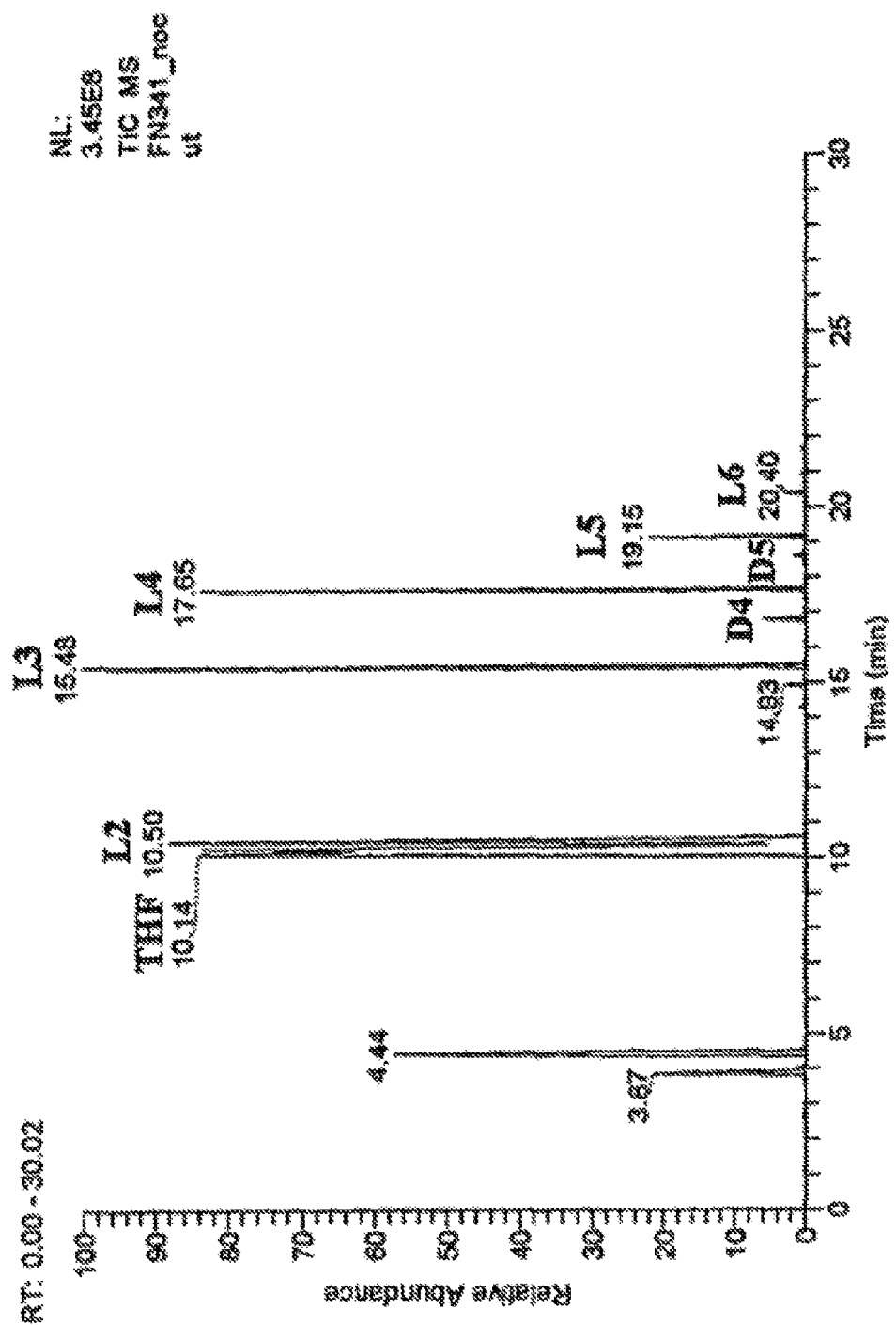
FIG. 5 shows, in first part, a GC of the reaction solution $Me_2SiCl_2$: $Me_3SiCl$ at a molar ratio of 4:1 and, in second part, at molar ratio of 1:4.

The object underlying the present invention is to provide a process for the cleavage of silicon-silicon bonds and/or silicon-chlorine bonds in mono-, poly- and/or oligosilanes, which is particularly simple and therefore cost-efficient.

This object is solved by a process for the cleavage of silicon-silicon bonds and/or of silicon cium-chlorine bonds in mono-, poly- and/or oligosilanes, in which the mono-, poly- and/or oligosilane is dissolved or suspended in ether or an ether-hydrochloric acid solution.

The ethers used in this invention are compounds of the general formula $R^1\text{—}O\text{—}R^2$, wherein $R^1$ and $R^2$ each include any alkyl and/or aryl radicals. As the case may be also cyclic ethers in high dilution with inert solvents may be used. Preferably diethyl ether is used.

Further, in the method of the invention an ether solution of hydrochloric acid, in particular a diethyl ether-hydrochloric acid solution, is preferably used. Also with ether as well as with the ether-hydrochloric acid solution (diethyl ether-hydrochloric acid solution), a synthetically easy cleavage of the silicon-silicon bonds and/or silicon-chlorine bonds in the poly- or oligosilanes is achieved, wherein in particular in one single reaction step the corresponding end products can be formed. The cleavage of the Si—Cl bonds in monosilanes is not carried out with ethers alone, but requires the use of ether-hydrochloric acid solutions (diethyl ether-hydrochloric acid solutions).

An example of the method of the invention relates to a method in which from halogenated polysilanes, particularly from chlorinated polysilanes, especially perchlorinated polysilanes (PCS), by cleavage of the silicon-silicon bonds halogenated oligosilanes, especially chlorinated oligosilanes, are prepared. This embodiment thus relates to the specific preparation of defined oligosilanes from halogenated polysilanes.

A preferred embodiment of the method according to the invention is characterized in that the halogenated polysilane is dissolved or suspended in ethyl ether ($Et_2O$) or an ethyl ether-hydrochloric acid solution, in particular, diethyl ether or a diethyl ether solution of hydrochloric acid.

Halogenated oligosilanes include in particular those having the formula $Si_nX_{2n+2}$, especially those represented by the formula $Si_nCl_{2n+2}$.

In preferred embodiments of the method according to the invention thermally produced halogenated polymer, particularly perchlorinated polysilane (T-PCS), or plasma-chemically produced halogenated polysilane, particularly perchlorinated polysilane (P-PCS) are reacted.

Subsequently some embodiments of the method for preparing defined oligosilanes are described.

In a first embodiment T-PCS is reacted with $Et_2O$ for the preparation of $Si_2Cl_6$.

In a second embodiment T/P-PCS is reacted with HCl in $Et_2O$ for the preparation of X—$Si(SiCl_3)_3$ (X=H, Cl).

In yet another embodiment T/P-PCS (i.e, thermally and/or plasma-chemically produced PCS) is reacted with HCl in $Et_2O$ for the preparation of $X_2Si(SiCl_3)_2$ (X=H, Cl).

The solution obtained from the reaction is isolated, particularly the resulting solid precipitates when they occur.

At least one halogenated oligosilane is isolated from the obtained solution for example by condensation, decantation or distillation.

In a preferred embodiment of the inventive method chlorinated oligosilanes are prepared from thermally produced perchlorinated polysilanes (T-PCS). Thermally produced PCS is synthetically more easily accessible by a conventional route than plasma-chemically produced notified PCS (P-PCS). T-PCS is preferably dissolved in $Et_2O$. The substance is completely soluble. First, a clouding of the solution takes place, but which then clears up again. After about 2 hours reaction time at room temperature, the following products are obtained:

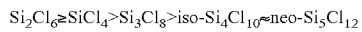

$Si_2Cl_6 \geq SiCl_4 > Si_3Cl_8 > \text{iso-}Si_4Cl_{10} \approx \text{neo-}Si_5Cl_{12}$ The products were characterized by comparison with $^{29}Si$ NMR spectra of authentic samples.

In a further embodiment of the inventive method P-PCS was dissolved or suspended in $Et_2O$. This gave a yellow-brown suspension, and a yellow-brown precipitate. After decanting the deep brown solution the following products were characterized by $^{29}Si$-NMR spectroscopy:

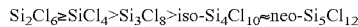

$Si_2Cl_6 \geq SiCl_4 > Si_3Cl_8 > \text{iso-}Si_4Cl_{10} \approx \text{neo-}Si_5Cl_{12}$ In the reaction of T-PCS or P-PCS with ether in addition to the specified oligosilanes small amounts of $Si(SiCl_3)_4$ are formed.

The solid is obviously insoluble high polymer PCS. This could be also converted into perchlorinated oligosilane, particularly $Si_2Cl_6$ in a subsequent chlorination.

Compared with the preparation from T-PCS, with P-PCS a considerably poorer $Si_2Cl_6$ access resulted by the formation of a precipitate, that is, a polymer of higher molecular weight.

The ether-hydrochloric acid solution, in particular the diethyl ether-hydrochloric acid solution (HCl-saturated ether solution) used in accordance with the invention was prepared by introducing HCl gas into ether at room temperature until a saturated solution (about 5 M) was obtained.

Thermally produced perchlorinated polysilane (T-PCS) was added to this solution of HCl in $Et_2O$ at a molar ratio $SiCl_2$ unit HCl of approximately 1/1. As products of the reaction at room temperature were obtained after 10 h reaction time:

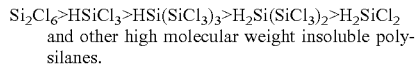

$Si_2Cl_6 > HSiCl_3 > HSi(SiCl_3)_3 > H_2Si(SiCl_3)_2 > H_2SiCl_2$
and other high molecular weight insoluble polysilanes.

In a corresponding reaction, now with a molar ratio of 4:1 and 18 h reaction time at room temperature, the following products were obtained:

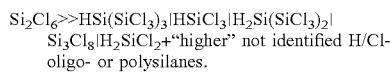

$Si_2Cl_6 >> HSi(SiCl_3)_3 | HSiCl_3 | H_2Si(SiCl_3)_2 |$
$Si_3Cl_8 | H_2SiCl_2 + \text{"higher"}$ not identified H/Cl- oligo- or polysilanes.

It was found that the degradation of the per-chlorinated polysilanes T/P-PCS to low molecular chlorosilanes increases with higher HCl concentration in $Et_2O$. If the preparation of higher molecular oligosilanes for example of $HSi(SiCl_3)_3$ and $H_2Si(SiCl_3)_2$ is desired, it is preferably worked with lower amounts of HCl. In both synthetic routes $Si_2Cl_6$ is the preferred product.

Further, P-PCS was reacted with $Et_2O$ and HCl in a molar ratio of 4.1 (18 h, room temperature). The following products were obtained:

A mixture of:

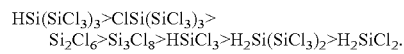

$HSi(SiCl_3)_3 > ClSi(SiCl_3)_3 >$
$Si_2Cl_6 > Si_3Cl_8 > HSiCl_3 > H_2Si(SiCl_3)_2 > H_2SiCl_2$.

Besides further (yet unidentified) oligosilanes were obtained in small amounts.

Another embodiment of the inventive method is characterized in that a solution of HCl in $Et_2O$ is used to cleave poly- or oligosilanes and the subsequent formation of siloxanes. Here specifically a solution of HCl in diethyl ether is used, with which each Si—Si— and Si—Cl bond, also in monosilanes, is cleaved and converted into a siloxane unit. In particular in this case, cyclic, cage-like and/or linear siloxanes can be obtained from organohalogendisilanes, e.g. $Me_nSi_2Cl_{6-n}$ (residue of the direct process, n=1-6).

Also, the inventive method is preferably used for the decomposition of mixtures of organohalogendisilanes, especially with chlorinated monosilanes.

The invention is illustrated below with reference to the exemplary embodiments.

The products were characterized as follows:

NMR analyzes were performed on a Bruker AV500 spectrometer. GC-MS analyzes were performed on a gas chromatograph Thermo Scientific Trace GC Ultra with coupled mass spectrometer ITQ 900 MS. The stationary phase (Machery-Nagel PERMABOND silanes) had a length of 50 m with an inner diameter of 0.32 mm. One µl of the sample solution was injected, whereby 1/25 were carried using helium as a carrier gas and a flow rate of 1.7 mL/min through the stationary phase. The temperature of the stationary phase is at first 50° C. for ten minutes, was then increased at a rate of 20° C./min up to 250° C. and placed on hold for a further 10 minutes at this final temperature. After exiting the column it was ionized with 70 eV and cationic fragments in the range 34-600 and 34-900, respectively, m/z mass per charge were measured.

PREPARATION OF HCL/$Et_2O$ SOLUTION

Diethyl ether (p.a., stabilized with butylhydroxytoluene) was previously dried over sodium/benzophenone and distilled. Then, in a Schlenk flask with gas inlet tube, HCl gas, previously passed through concentrated sulfuric acid, was introduced into the diethyl ether. A slight warming of the solution occurred. The saturation was recognizable, when the quantity of the discharged gas is equal to the quantity of the introduced gas (indicated by a bubble counter). For completion this state was maintained for further 30 minutes.

By weighing it is determined that 76 g of HCl gas is dissolved in 298 g of diethyl ether (~5 M). The molarity of HCl/$Et_2O$ solution was determined additionally by titration of an aliquot with water and NaOH.

Exemplary Embodiment 1

T-PCS (freed of $SiCl_4$ in vacuo as far as possible; 64.64 g) was reacted with a saturated solution of HCl in diethyl ether (5 M, 113 mL) with ice cooling (0° C.) (a). The brownish solution was stirred for 16 hours and gradually warmed to room temperature (24° C.), whereupon a color change to pale yellow occurred.

The volatile components of the reaction mixture were condensed in vacuo (0.1 mbar) into a −196° C. (liquid $N_2$) cooled cold trap (b). This condensate (c, 145 g) was then warmed to room temperature and distilled at normal pressure up to a boiling temperature of 80° C. The composition of the distillate (d, 104 g) is listed in column E (including the amounts in % and the characteristic $^{29}$Si NMR shift values of the compounds). The residue from this distillation (e, 23 g) was subjected again at reduced pressure (membrane pump; 30 mbar) up to a boiling temperature of max. 130° C. to fractionated distillation to obtain two fractions. The distillation residue (f, 2 g) contains the compounds listed in column C, the distillate (g, 16 g), the compounds in column D. The condensation residue from (b) (h, 10 g) was distilled at reduced pressure at the rotary vane pump (0.1 mbar) up to a boiling temperature of 130° C. distilled. The residue remaining after this distillation (i, 7 g) consists mostly of insoluble chlorinated polysilanes as well as traces of the compounds mentioned in column A. In the distillate from (h) (j, 3 g), the compounds of column B are identified.

FIG. 1

Exemplary Embodiment 2

P-PCS (freed from $SiCl_4$ in vacuo as far as possible; 4.9 g) was reacted with a saturated solution of HCl in diethyl ether (5 M, 2.5 mL) under ice-cooling (0° C.) (a). The red-brown solution was stirred for 14 hours and gradually warmed to room temperature (24° C.), whereupon only a slight discoloration occurred.

The volatile components of the reaction mixture were condensed in vacuo (0.1 mbar) into a −196° C. (liquid $N_2$) cooled cold trap (b). The composition of this condensate (c, 4.2 g) is indicated in column B (including the amounts in % and the characteristic $^{29}$Si NMR chemical shift values of the compounds). The condensate residue (d, 2.2 g) consists of the compounds indicated in column A.

FIG. 2

Exemplary Embodiment 3

In this method, "cleavable" disilanes $Me_xSi_2Cl_{6-x}$ (x=0-3) and "non-cleavable" disilanes (x=4-6) are cleaved in a single reaction step into monomeric functional silanes, which subsequently after an exchange reaction Si—X→Si—OEt (X═H, Cl) can be directly transformed preferably into methyl- and/or, less preferred, into ethoxysubstituted cyclic siloxanes. The reagent employed here for Si—Si and Si—Cl bond cleavage is a diethyl ether solution saturated with HCl gas (HCl/$Et_2O$).

The disilanes used for the investigations $Me_xSi_2Cl_{6-x}$ (x=0 to 6) and $Me_5Si_2H$ were purchased and are known from the literature. They were checked for purity by GC-MS analysis and NMR spectroscopy ($^1H$—, $^{29}$Si—NMR). The identified substance specific chemical shift values are consistent with literature data (see particularly R. Lehnert, M. Hoeppner, H. Kelling, Z. anorg. allg. Chem. 1990, 591, 209-213). The same applies for the cyclic, linear and cage-like siloxanes which have been obtained as the reaction products from the reaction of the disilanes $Me_xSi_2Cl_{6-x}$ (x=0 to 6) and $Me_5Si_2H$. Since these siloxanes are basic building units for the technical manufacture of silicones, their substance-specific NMR chemical shift values particularly are also known from literature (see particularly H. Marsmann, $^{29}$Si-NMR Spectroscopic Results in NMR: Oxygen-17 and silicone-29; Springer-Verlag: New York, 1981, 27, 65-235). Since for all reactants and products in addition to the mass spectrometric fragmentation, the retention times in the gas chromatogram are characteristic, in table 1 the employed disilanes as well as those obtained by substitution of Si—Cl→Si—OR (R═Et, n-Bu) are listed with the characteristic retention time (in minutes) and the associated mass fragment. The disilanes 1-8 are listed in a sequence of decreasing shares in the residue of the disilane fraction of the Müller-Rochow process. Tab. 2 contains comparable data for monomeric silane degradation products, also alkoxysubstituted. The cyclic siloxanes D3 to D10 are listed in table 3, and in table 4 the values of linear siloxanes L2 to L13 are indicated. Table 5 contains the data for cage-type structure silsesquioxanes $(RSiO_{3/2})_x$ (R═Me, Vi, Et; x=8, 10, 12) and "open" precursors.

TABLE 1

GC-MS data for disilanes.

| No. | Disilane | $R_T$ GC | Mass | Fragment |
|---|---|---|---|---|
| 1 | $Cl_2MeSi$—$SiMeCl_2$ | 17.06 | 193 | $[M - CH_3]^+$ |
| 2 | $ClMe_2Si$—$SiMe_2Cl$ | 16.63 | 186 | $[M]^+$ |
| 3 | $Me_3Si$—$SiMe_2Cl$ | 15.47 | 151 | $[M - H]^+$ |
| 4 | $Me_3Si$—$SiMe_3$ | 12.36 | 146 | $[M]^+$ |
| 5 | $Me_3Si$—$SiMe_2H$ | 11.02 | 131 | $[M - H]^+$ |
| 6 | $Cl_3Si$—$SiCl_3$ | — | — | |
| 7 | $Me_3Si$—$SiMeCl_2$ | 16.40 | 151 | $[M - Cl]^+$ |
| 8 | $ClMe_2Si$—$SiMeCl_2$ | 17.02 | 171 | $[M - Cl]^+$ |
| 9 | $Cl_2MeSi$—$SiMeCl(OEt)$ | 18.04 | 209 | $[M - C_2H_5]^+$ |
| 10 | $(EtO)ClMeSi$—$SiMeCl(OEt)$ | 18.64 | 211 | $[M - Cl]^+$ |
| 11 | $Cl_2MeSi$—$SiMeCl(OBu)$ | 19.59 | 229 | $[M - Cl]^+$ |
| 12 | $(BuO)ClMeSi$—$SiMeCl(OBu)$ | 21.29 | 267 | $[M - Cl]^+$ |
| 13 | $(BuO)_2MeSi$—$SiMeCl(OBu)$ | 22.63 | 341 | $[M + H]^+$ |

TABLE 2

GC-MS data for monosilanes from Si—Si Bond cleavages.

| No. | Silane | $R_T$ GC | MS | Basic Fragment |
|---|---|---|---|---|
| I | $Me_3SiH$ | 3.25 | 43 | $[M - H]^+$ |
| II | $Me_3SiCl$ | 6.45 | 93 | $[M - CH_3]^+$ |
| III | $Me_3SiOEt$ | 7.61 | 103 | $[M - CH_3]^+$ |
| IV | $MeSiCl_3$ | 7.95 | 147 | $[M]^+$ |
| V | $Me_2SiCl_2$ | 8.53 | 113 | $[M - CH_3]^+$ |
| VI | $(EtO)_2MeSiH$ | 11.89 | 133 | $[M - H]^+$ |
| VII | $(EtO)MeSiCl_2$ | 12.66 | 143 | $[M - CH_3]^+$ |
| VIII | $(EtO)_2SiHCl$ | 13.58 | 153 | $[M - H]^+$ |
| IX | $(EtO)_2MeSiCl$ | 14.83 | 153 | $[M - CH_3]^+$ |
| X | $(BuO)MeSiCl_2$ | 16.30 | 151 | $[M - Cl]^+$ |
| XI | $(BuO)_2MeSiCl$ | 18.87 | 225 | $[M + H]^+$ |

TABLE 3

GC-MS data for cyclic methylsiloxanes.

| No. | Siloxane | $R_T$ GC | Mass | Fragment |
|---|---|---|---|---|
| D3 | $(Me_2SiO)_3$ | 14.21 | 207 | $[M - CH_3]^+$ |
| D4 | $(Me_2SiO)_4$ | 16.78 | 281 | $[M - CH_3]^+$ |
| D5 | $(Me_2SiO)_5$ | 18.46 | 355 | $[M - CH_3]^+$ |
| D6 | $(Me_2SiO)_6$ | 19.91 | 429 | $[M - CH_3]^+$ |
| D7 | $(Me_2SiO)_7$ | 21.29 | 503 | $[M - CH_3]^+$ |
| D8 | $(Me(EtO)SiO)_4$ | 18.62 | 401 | $[M - CH_3]^+$ |
| D9 | $(Me(EtO)SiO)_2(Me_2SiO)_3$ | 19.26 | 415 | $[M - CH_3]^+$ |
| D10 | $(Me(EtO)SiO)_5$ | 21.11 | 505 | $[M - CH_3]^+$ |

TABLE 4

GC-MS data for linear methyl siloxanes.

| No. | Siloxane | $R_T$ GC | Mass | Fragment |
|---|---|---|---|---|
| L2 | $Me_3SiOSiMe_3$ | 10.45 | 147 | $[M - CH_3]^+$ |
| L3 | $Me_3Si(OSiMe_2)OSiMe_3$ | 15.50 | 221 | $[M - CH_3]^+$ |
| L4 | $Me_3Si(OSiMe_2)_2OSiMe_3$ | 17.66 | 295 | $[M - CH_3]^+$ |

TABLE 4-continued

GC-MS data for linear methyl siloxanes.

| No. | Siloxane | $R_T$ GC | Mass | Fragment |
|---|---|---|---|---|
| L5 | Me$_3$Si(OSiMe$_2$)$_3$OSiMe$_3$ | 19.19 | 369 | [M – CH$_3$]$^+$ |
| L6 | Me$_3$Si(OSiMe$_2$)$_4$OSiMe$_3$ | 20.41 | 443 | [M – CH$_3$]$^+$ |
| L7 | Me$_3$Si(OSiMe$_2$)$_5$OSiMe$_3$ | 21.66 | 517 | [M – CH$_3$]$^+$ |
| L8 | (EtO)$_2$MeSiO(EtOMeSiO)$_3$SiMe(OEt)$_2$ | 21.60 | 579 | [M – CH$_3$]$^+$ |
| L9 | MeSi(OSiMe$_3$)$_2$O(OSiMe$_3$)$_2$SiMe | 20.21 | 443 | [M – CH$_3$]$^+$ |
| L10 | (EtO)Me$_2$SiOSiMe$_2$Cl | 16.28 | 213 | [M + H]$^+$ |
| L11 | (EtO)Me$_2$SiOSiMe$_2$(OEt) | 16.55 | 207 | [M – CH$_3$]$^+$ |
| L12 | ClMe$_2$SiSiMe$_2$—O—SiMe$_2$SiMe$_2$Cl | 21.04 | 283 | [M – Cl]$^+$ |
| L13 | MeSi(OSiMe$_3$)$_3$ | 17.48 | 295 | [M – CH$_3$]$^+$ |

TABLE 5

GC-MS data for silsesquioxanes.

| No. | Siloxane | $R_T$ GC | Mass | Fragment |
|---|---|---|---|---|
| T1 | (MeSiO$_{3/2}$)$_8$ | 20.65 | 521 | [M – CH$_3$]$^+$ |
| T2 | (MeSiO$_{3/2}$)$_{10}$ | 22.69 | 655 | [M – CH$_3$]$^+$ |
| T3 | (MeSiO$_{3/2}$)$_{12}$ | 24.68 | 789 | [M – CH$_3$]$^+$ |
| T4 | C$_{12}$H$_{34}$O$_{13}$Si$_8$ | 21.09 | 595 | [M – CH$_3$]$^+$ |
| T5 | (ViSiO$_{3/2}$)$_8$ | 27.06 | 631 | [M – H]$^+$ |
| T6 | (ViSiO$_{3/2}$)$_{10}$ | 37.59 | 789 | [M – H]$^+$ |
| T7 | (EtSiO$_{3/2}$)$_8$ | 27.76 | 619 | [M – C$_2$H$_5$]$^+$ |
| T8 | C$_{16}$H$_{44}$O$_{14}$Si$_8$ | 22.01 | 669 | [M – CH$_3$]$^+$ |
| T9 | C$_{20}$H$_{54}$O$_{15}$Si$_8$ | 23.26 | 743 | [M – CH$_3$]$^+$ |

Furthermore, in table 6 below the analytical data of further solvents and reagents used in our studies are listed.

TABLE 6

GC-MS data of the solvent and HCl.

| Substance | $R_T$ GC | Mass | Fragment |
|---|---|---|---|
| HCl | 2.70 | 36 | [M]$^+$ |
| EtCl | 3.87 | 63 | [M – H]$^+$ |
| EtOH | 4.08 | 47 | [M + H]$^+$ |
| Et$_2$O | 4.35 | 75 | [M + H]$^+$ |
| CH$_2$Cl$_2$ | 5.20 | 84 | [M]$^+$ |
| THF | 10.30 | 73 | [M + H]$^+$ |
| Butylated Hydroxytoluene (BHT) | 21.78 | 220 | [M]$^+$ |

Attempts for the disilane cleavage were carried out with solutions of HCl in Et$_2$O with different concentrations/conditions.

The experiments were performed at room temperature in a Schlenk flask with stirring. 100-300 mg of the disilane were introduced, and 3-5 mL of a saturated solution of HCl in Et$_2$O was added thereto. After a corresponding period of time a portion (~0.1 mL) of the reaction solution was removed for analysis by GC-MS. For NMR spectroscopy 0.4-0.5 mL of the reaction solution was mixed with 0.1 mL C$_6$D$_6$ in an NMR tube.

Experiments at elevated temperatures were carried out in glass ampoules. The vials have a length of 125 mm, an outer diameter of 26 mm and a wall thickness of 2 mm. The internal volume up to the melting site corresponds to ~43 mL. Also in this case to 100 to 300 mg of the disilane 3 to 5 ml of a saturated solution of HCl in Et$_2$O were added. The reaction mixture was frozen using liquid nitrogen and sealed under vacuum. The vial with the reaction solution was then brought to room temperature, placed in a screwable metal pipe and ultimately heated in a vacuumed drying oven to the appropriate reaction temperature. The reaction pressure in the glass ampoule is estimated at 5-10 bar.

In this case, the degradation of 1,1,2,2-tetrachlorodimethyldisilane, 1,2-dichlorotetramethyldisilane, chloropentamethyldisilan, hexamethyldisilane, pentamethyldisilane and mixtures of the above-mentioned first four substances was carried out. Furthermore, the degradation of the disilane-residue from a technical Müller-Rochow synthesis and the reaction of monomeric trichlorosilane with HCl/Et$_2$O, the reaction of monomeric dichlorosilanes with HCl/Et$_2$O, the reaction of monomeric monochlorosilanes with HCl/Et$_2$O and mixtures of monosilanes with HCl/Et$_2$O-solutions was carried out. The following results were obtained:

Each Si—Si and Si—Cl bond was cleaved using a solution of HCl in diethyl ether in one step and transferred into a siloxane unit. Methyl groups of the silanes (with the exception of hexamethyldisilane, which reacts in part to pentamethylchlorodisilane) remained untouched, and siloxanes were obtained corresponding to the remaining functionality:

MeSi>trifunctional siloxanes

Me$_2$Si>difunctional siloxanes, chain extension

Me$_3$Si>monofunctional siloxanes, overcapping reagent

These reactions were performed via a cleavage of diethyl ether by means of HCl, which provided ethanol for the alcoholysis of the Si—Cl groups. The ethoxydisilanes formed were thereby more prone to Si—Si bond cleavage and transferred into the monosilane. Under the chosen reaction conditions, then directly condensation of the ethoxysilanes occurred, that is, with subsequent formation of the siloxane units.

Exemplary Embodiment 4 a) A reaction of Me$_2$SiCl$_2$ with HCl/Et$_2$O at 120° C. for 67 h leads to the following cyclic siloxanes (GC-MS analysis, FIG. 3),

FIG. 3 b) A reaction of mixtures of Me$_2$SiCl$_2$ and Me$_3$SiCl with HCl/Et$_2$O leads after 68 h at 120° C. as expected to a mixture of cyclic and linear siloxanes. This is exemplified in FIG. 4.

FIG. 4

Increasing the Me$_2$SiCl$_2$ stake (molar ratio Me$_2$SiCl$_2$:Me$_3$SiCl=4:1) under similar conditions (120° C., 68 h) results in a significant increase in the proportion of cyclic siloxanes in the 10 reaction mixture (FIG. 5, page 5).

FIG. 5

Increasing the Me$_3$SiCl stake (molar ratio Me$_2$SiCl$_2$:Me$_3$SiCl=1:4) leads under similar conditions (120° C., 68 h) to a significant increase in the proportion of linear siloxanes (FIG. 5, Page 6) in the reaction mixture.

c) The reaction of MeSiCl$_3$ with HCl/Et$_2$O for 65 h at 120° C. leads to the silsesquioxanes T1, T2 and T3.

To generalize this reaction sequence exemplarily further trichlorosilanes XSiCl$_3$ (X=vinyl, ethyl) were reacted with HCl/Et$_2$O reacted. The reaction of trichlorovinylsilane (ViSiCl$_3$) with HCl/Et$_2$O for 69 h at 120° C. leads to the almost selective formation of (ViSiO$_{3/2}$)$_8$ (T5, $R_T$=27.06 min) in addition to traces of (ViSiO$_{3/2}$)$_{10}$ (T6, $R_T$=37.59 min). Trichloroethylsilane (EtSiCl$_3$) reacts with HCl/Et$_2$O after 68 h at 120° C. also selectively to the corresponding silsesquioxane (EtSiO$_{3/2}$)$_8$ (T7, R$_T$=27.75 min).

As expected mixtures of MeSiCl$_3$, EtSiCl$_3$ and ViSiCl$_3$ react to silsesquioxanes with random distribution of the methyl, ethyl and vinyl groups at the "corners" of the silsesquioxanes (FIG. 6, Tab. 7)

FIG. 6

TABLE 7

| | GC-MS data of "mixed" silsesquioxanes | | |
|---|---|---|---|
| R$_T$ GC | Silsesquioxane | Mass | Fragment |
| 22.37 | (MeSiO$_{3/2}$)$_6$ (ViSiO$_{3/2}$)(EtSiO$_{3/2}$) | 562 | [M − H]$^+$ |
| 23.08 | (MeSiO$_{3/2}$)$_5$ (ViSiO$_{3/2}$)$_2$(EtSiO$_{3/2}$) | 574 | [M − H]$^+$ |
| 23.88 | (MeSiO$_{3/2}$)$_4$ (ViSiO$_{3/2}$)$_2$(EtSiO$_{3/2}$)$_2$ | 589 | [M − H]$^+$ |
| 24.85 | (MeSiO$_{3/2}$)$_3$ (ViSiO$_{3/2}$)$_3$(EtSiO$_{3/2}$)$_2$ | 602 | [M]$^+$ |
| 25.93 | (MeSiO$_{3/2}$)$_2$ (ViSiO$_{3/2}$)$_3$(EtSiO$_{3/2}$)$_3$ | 602 | [M − CH$_3$]$^+$ |

The invention claimed is:

1. A method for the cleavage of one or more silicon-silicon bonds in one or more polysilanes, which are substituted by at least one substituent selected from the group consisting of halogen atoms and organic groups,
said method comprising dissolving or suspending the one or more polysilanes in an ether-HCl solution, which is obtained by introducing HCl gas into the ether, to effect the cleavage of the at least one silicon-silicon bond to prepare a mixture including Si$_2$Cl$_6$.

2. The method of claim 1, wherein the one or more polysilanes comprise halogenated polysilane.

3. The method of claim 2, wherein the halogenated polysilane is chlorinated polysilane.

4. The method of claim 2, wherein the halogenated polysilane is dissolved or suspended in ethyl ether-hydrochloric acid solution.

5. The method according to claim 1, wherein the one or more polysilanes comprise a thermally produced halogenated polysilane.

6. The method according to claim 5, wherein the thermally produced halogenated polysilane is a thermally produced perchlorinated polysilane.

7. The method according to claim 1, wherein the one or more polysilanes is a plasma-chemically produced halogenated polysilane.

8. The method according to claim 6, wherein the thermally produced perchlorinated polysilane is reacted with HCl in diethyl ether (Et$_2$O), to prepare a mixture including Si$_2$Cl$_6$.

9. The method according to claim 7, wherein the plasma-chemically produced halogenated polysilane is reacted with HCl in Et$_2$O, to prepare a mixture including Si$_2$Cl$_6$.

10. The method according to claim 6, wherein the thermally produced perchlorinated polysilane is reacted with HCl in Et$_2$O to prepare the mixture including XSi(SiCl$_3$)$_3$ where X═H or Cl.

11. The method according to claim 9, wherein the plasma-chemically produced halogenated polysilane is reacted with HCl in Et$_2$O to prepare the mixture including XSi(SiCl$_3$)$_3$ where X═H or Cl.

12. The method according to claim 6, wherein the thermally produced perchlorinated polysilane is reacted with HCl in Et$_2$O to prepare the mixture including X$_2$Si(SiCl$_3$)$_2$ where X═H.

13. The method according to claim 7, wherein the plasma-chemically produced halogenated polysilane is reacted with HCl in Et$_2$O to prepare the mixture including X$_2$Si(SiCl$_3$)$_2$ where X═H.

14. The method according to claim 2, wherein Si$_2$Cl$_6$ is isolated from the ether-HCl solution obtained after cleavage.

15. The method of claim 3, wherein the chlorinated polysilane is perchlorinated polysilane.

16. The method according to claim 1 wherein the ether-hydrochloric acid solution includes an ether having the formula R$^1$—O—R$^2$, wherein R$^1$ and R$^2$ are alkyl groups.

17. The method according to claim 16 wherein R$^1$ and R$^2$ are ethyl groups.

* * * * *